(12) United States Patent
Bozorgtabar et al.

(10) Patent No.: US 10,614,575 B2
(45) Date of Patent: *Apr. 7, 2020

(54) SEARCHING TREES: LIVE TIME-LAPSE CELL-CYCLE PROGRESSION MODELING AND ANALYSIS

(71) Applicant: International Business Machines Corporation, Armonk, NY (US)

(72) Inventors: Seyedbehzad Bozorgtabar, Melbourne (AU); Rahil Garnavi, Melbourne (AU); Suman Sedai, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,509

(22) Filed: Dec. 28, 2017

(65) Prior Publication Data
US 2018/0365842 A1    Dec. 20, 2018

Related U.S. Application Data

(63) Continuation of application No. 15/627,686, filed on Jun. 20, 2017.

(51) Int. Cl.
| | |
|---|---|
| *G06T 7/215* | (2017.01) |
| *G06T 7/00* | (2017.01) |
| *G06K 9/00* | (2006.01) |
| *G06N 5/02* | (2006.01) |
| *G06N 7/00* | (2006.01) |

(Continued)

(52) U.S. Cl.
CPC ............ *G06T 7/215* (2017.01); *G06K 9/0014* (2013.01); *G06K 9/00147* (2013.01); *G06N 3/0445* (2013.01); *G06N 3/0454* (2013.01); *G06N 5/02* (2013.01); *G06N 7/005* (2013.01); *G06T 7/0016* (2013.01); *G06T 7/246* (2017.01); *G06T 2207/10056* (2013.01); *G06T 2207/20081* (2013.01); *G06T 2207/20084* (2013.01); *G06T 2207/30024* (2013.01); *G06T 2207/30241* (2013.01)

(58) Field of Classification Search
CPC combination set(s) only.
See application file for complete search history.

(56) References Cited

U.S. PATENT DOCUMENTS 5,930,154 A  *  7/1999  Thalhammer-Reyero ..................
                                             G05B 17/02
                                                  703/11
7,817,841 B2 * 10/2010  Padfield ............... G06K 9/0014
                                                 382/133

(Continued)

OTHER PUBLICATIONS

C. Indhumathi et al., An automatic segmentation algorithm for 3D cell cluster splitting using volumetric confocal images, Journal of Microscopy, vol. 243, Pt 1, Feb. 2011, pp. 60-76.

(Continued)

*Primary Examiner* — Tsung Yin Tsai
(74) *Attorney, Agent, or Firm* — Joseph Petrokaitis; Otterstedt, Wallace & Kammer, LLP (57) ABSTRACT

A method of tracking a cell through a plurality of images includes selecting the cell in at least one image obtained at a first time, generating a track of the cell through a plurality of images, including the at least one image, obtained at different times using a backward tracking, and generating a cell tree lineage of the cell using the track.

17 Claims, 5 Drawing Sheets

(51) Int. Cl.
  *G06T 7/246* (2017.01)
  *G06N 3/04* (2006.01)

(56) References Cited

U.S. PATENT DOCUMENTS

| | | | | |
|---|---|---|---|---|
| 7,907,769 | B2* | 3/2011 | Sammak | G06K 9/00127 |
| | | | | 382/133 |
| 9,141,756 | B1* | 9/2015 | Hillis | G06F 19/30 |
| 2003/0108231 | A1* | 6/2003 | Hamahashi | G06K 9/00127 |
| | | | | 382/133 |
| 2006/0127881 | A1* | 6/2006 | Wong | G06K 9/00127 |
| | | | | 435/4 |
| 2007/0109874 | A1* | 5/2007 | Padfield | G06T 7/11 |
| | | | | 365/189.04 |
| 2010/0046823 | A1* | 2/2010 | O Ruanaidh | G06K 9/00134 |
| | | | | 382/133 |
| 2010/0153082 | A1* | 6/2010 | Newman | G01N 33/5008 |
| | | | | 703/11 |
| 2012/0134571 | A1* | 5/2012 | Ito | G06T 1/00 |
| | | | | 382/133 |
| 2014/0120543 | A1* | 5/2014 | Olaussen | C12Q 1/6886 |
| | | | | 435/6.12 |
| 2014/0170659 | A1* | 6/2014 | Olaussen | C12Q 1/6886 |
| | | | | 435/6.11 |
| 2015/0269730 | A1* | 9/2015 | Lee | G06T 7/20 |
| | | | | 382/254 |
| 2018/0365842 | A1* | 12/2018 | Bozorgtabar | G06T 7/0016 |

OTHER PUBLICATIONS

Wesley R. Legant et al., Measurement of mechanical tractions exerted by cells in three-dimensional matrices, Nature Methods 7, Dec. 2010, pp. 969-971.

Alexandre Dufour et al., Segmenting and Tracking Fluorescent Cells in Dynamic 3-D Microscopy With coupled Active Surfaces, IEEE Transactions on Image Processing, vol. 14, No. 9, Sep. 2005, pp. 1396-1410.

Seyedbehzad Bozorgtabar et al., unpublished U.S. Appl. No. 15/627,686, filed Jun. 20, 2017, Searching Trees: Live Time-Lapse Cell-Cycle Progression Modeling and Analysis, pp. 1-21 plus 6 sheets of drawings.

Paul J. Otterstedt, List of IBM Patents or Patent Applications Treated as Related, Jun. 28, 2018, pp. 1-2.

* cited by examiner

SEARCHING TREES: LIVE TIME-LAPSE CELL-CYCLE PROGRESSION MODELING AND ANALYSIS

CROSS-REFERENCE TO RELATED APPLICATION

This application is a continuation of U.S. patent application Ser. No. 15/627,686, filed Jul. 20, 2017, the complete disclosure of which is expressly incorporated herein by reference in its entirety for all purposes.

BACKGROUND

The present disclosure relates to methods for producing temporal cell trajectories using accurate cell segmentation.

Methods of understanding embryonic development, such as in tracking cell lineages, are an important aspect of developmental biology. The ability to track individual cells changes (e.g., cell morphological changes) during development has existed for some time. However, the ability to track cells over longer time periods or when the cells migrate through the body is not currently known. For example, the ability to track cells over time is hampered by the large amounts of time-lapse image data produced by live cell imaging, which is typically more information than can be digested by a human observer. Moreover, interpreting the image data, e.g., identifying different cells having with different shapes and vectors, and which are disposed in densely-packed groups, is a challenging task.

BRIEF SUMMARY

According to an exemplary embodiments of the present invention, a method of tracking a cell through a plurality of images includes selecting the cell in at least one image obtained at a first time, generating a track of the cell through a plurality of images, including the at least one image, obtained at different times using a backward tracking, and generating a cell tree lineage of the cell using the track.

According to at least one embodiment of the present invention, a method of tracking a cell through a plurality of images includes selecting the cell in at least one image obtained at a first time, generating a track of the cell through a plurality of images, including the at least one image, obtained at different times using a backward tracking tracing the cell back in time until detecting a mitosis event of the cell, modeling a cell cycle duration of the cell using a time of the mitosis event, modeling a rate of mitosis of the cell using the backward tracking, labeling, simultaneously, a plurality of cells, including the cell, with different identities in the plurality of images, and generating a cell tree lineage of the plurality of cells using the track.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. Embodiments of the present invention can be applied, for example, to monitor tissue development to detect abnormal development. Exemplary output parameters of a system configured according to an embodiment of the present invention, such as cell division time, death time, migration rate etc, can enable biologists to model cell behavior and develop techniques to fight disease, such as Cancer.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

According to an exemplary embodiment of the present invention, a model of temporal cell behavior is trained and used in performing an atomic risk assessment. The model is applicable to predict a critical point, a time when the cell behavior will be risky, enabling improved decision making in a patient's treatment plan.

Figure 1:
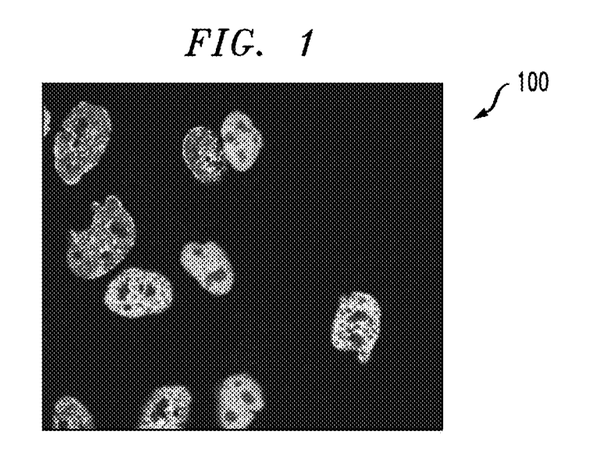
FIG. 1 is an input image of fluorescent Chinese hamster (*Cricetulus griseus*) ovarian cell according to an embodiment of the present invention.
Figure 2:
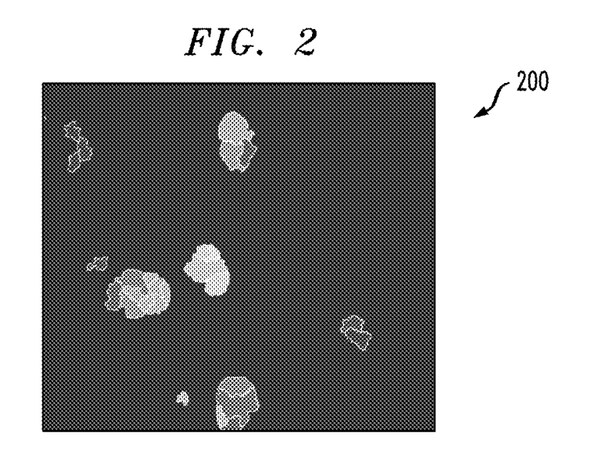
FIG. 2 is an exemplary cell segmentation of FIG. 1 using a watershed segmentation method.
Figure 3:
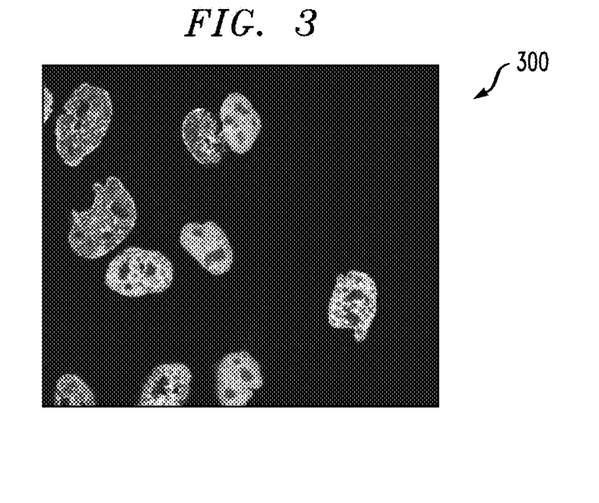
FIG. 3 is a ground truth segmentation of FIG. 1.

Tracking multiple cells in time-lapse microscopy images (hereinafter, image data) is a challenging task. For example, cells tend to change appearance and location, similar nearby cells need to be tracked to avoid misapprehension, and many cells are prone to missed detection or occlusion. For example, given an input image (see FIG. 1, 100), a typical segmentation method such as a watershed segmentation method results in a segmentation result that may exhibit a misidentification problem (see FIG. 2, 200) when compared to a ground truth (see FIG. 3, 300).

Cell image analysis methods typically assume that the appearance of a cell does not change over time, and do not consider dynamic information, such as cell velocity, at all. However, during the cell cycle, both cell appearance and cell velocity change over the time.

Figure 4:
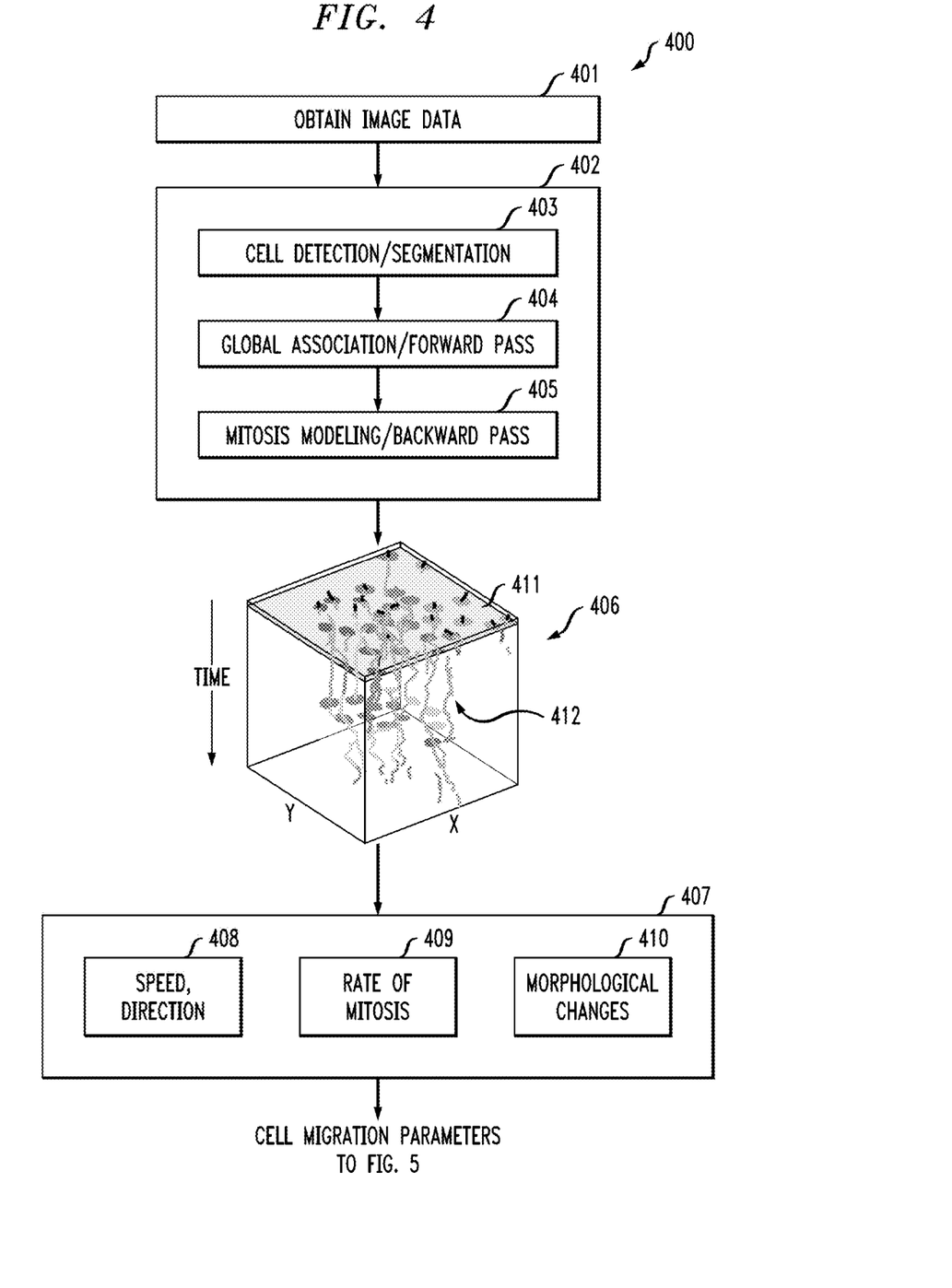
FIG. 4 is a flow diagram of a method of determining cell migration parameters according to an embodiment of the present invention.
Figure 5:
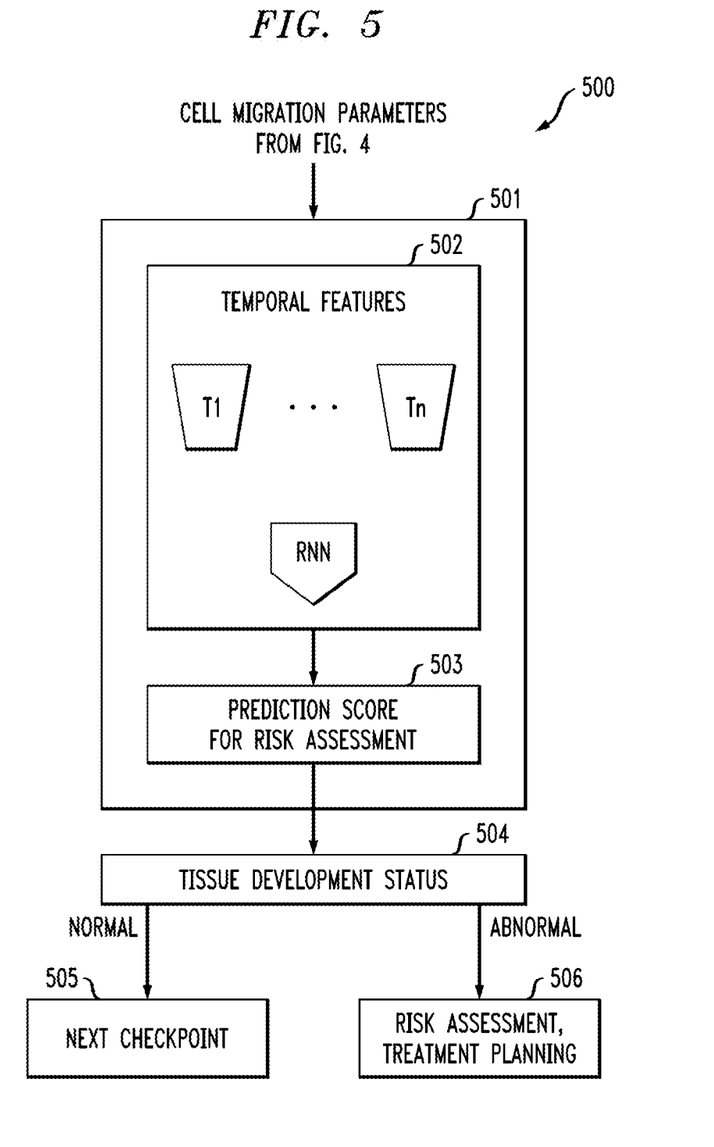
FIG. 5 is a flow diagram of a method of assessing risk according to an embodiment of the present invention.

According to an exemplary embodiment of the present invention, a model of temporal cell behavior is trained (see FIG. 4) and used in generating one or more risk assessments (see FIG. 5).

Figure 6:
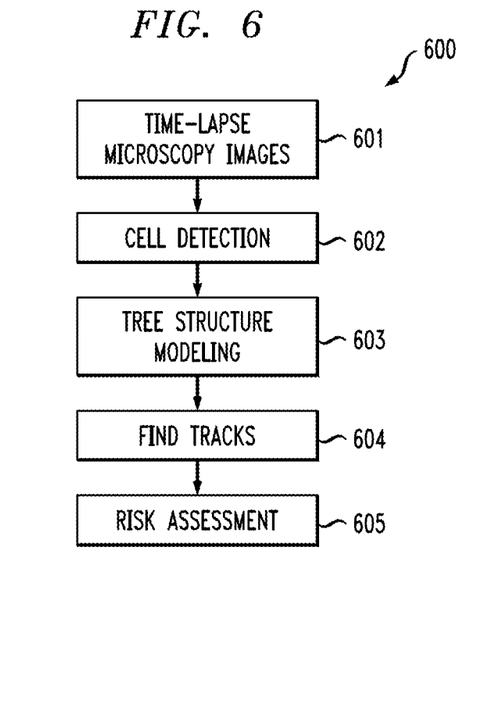
FIG. 6 is a flow diagram of a method of producing temporal cell trajectories according to an embodiment of the present invention.

According to an embodiment of the present invention and referring to FIG. 6, a training and risk assessment method 600 includes obtaining image data 601, detecting cells in the image data 602, modeling the cells over time to generate a tree structure 603 (see FIG. 7), detecting cell tracks 604 (see also FIG. 4, data structure 406), and performing a risk assessment 605 (see FIG. 5). According to an embodiment of the present invention, the risk assessment is based on high-level temporal features extracted from the cell trajectories (see FIG. 4, block 407).

According to an embodiment of the present invention, the image data 601, including a plurality of image fames, is obtained over a period of time (e.g., a few hours). It should be understood that the image data can be obtained over different periods of time sufficient to track cell linage. For example, the period of time may be selected based on the life cycle of the cells under investigations.

Referring again to FIG. 4, according to an embodiment of the present invention a method of generating cell migration parameters 400 includes obtaining image data 401, a modeling phase 402. The modeling phase 402 includes detecting cells in the obtained image data 403 (see also FIG. 6, block 601), performing a global association of cells in consecutive frames 404 and mitosis modeling of the cells 405.

According to an embodiment of the present invention, the image data 401 is obtained by collecting the (live) cells of interest (e.g., by biopsy of a patient, from culture, etc.). These cells are prepared for imaging, e.g., by presentation in a tissue culture dish with an appropriate media for sustaining the cells and/or imaging. The prepare cells are then imaged by using an imaging device, such as, a wide-field microscope.

According to an embodiment of the present invention, in the modeling phase 402, the cell detection 403 includes segmenting cells of interest in a foreground area of individual image frames from a background area of the image frames. According to exemplary embodiments of the present invention, different cell image analysis methods can be used to perform the segmentation at block 403. In at least one embodiment of the present invention a convolutional network is used to detect cells in the image data using features cues learned at different layers of the convolutional network and with varying resolutions and scales. In one or more embodiments of the present invention a supervised machine learning system is used to performed the segmentation and detect cells, wherein the supervised machine learning system is trained to recognize cells of interest.

According to an embodiment of the present invention, the modeling phase 402 distinguishes different cell instances segmented in the image data over time, tracking individual cells over time using a motion estimation using both forward and backward searching. According to an embodiment of the present invention, during the modeling phase 402, the motion of a cell is tracked by generating a tracklet, which records the position of the cell from one frame to the next. Each tracklet includes a head and a tail, and new positions of cell (i.e., in a next subsequent frame) are added to the tail of the tracklet.

According to an exemplary embodiment of the present invention, the modeling phase 402 includes a forward pass 404 in which a set of initial cell tracks are generated. According to an embodiment of the present invention, the global association 404 finds the same cell in different image frames of the image data. According to an embodiment of the present invention, the global association 404 performs a data association in which similar cells are connected across time. Connected cells are assigned a same ID during cell tracking (see FIG. 6, block 604). More particularly, each initial cell track corresponds to an initial estimate of cell movement. In the forward pass 404, each cell in a given image frame (i.e., at a certain time) is associated with one successor cell in the subsequent frame. According to an embodiment of the present invention, the association of cells between two frames is defined as a one-to-one relationship and is tracked using cell identifications. That is, according to an embodiment of the present invention, cells of interest are assigned different identifications, and the same cell in different frames has the same identification.

According to one or more embodiments of the present invention, in the forward pass 404, cells in sequential frames are associated by considering an overlap criterion. For example, if a cell (e.g., obtained either by the segmentation or detection) in a first frame overlaps more than 60% of the area of a cell in a second frame, then the first and second cell are determined to be the same cell and an association is identified. It can be assumed that the first frame and the second frame have a same absolute position, i.e., a field of view does not change.

According to one or more embodiments of the present invention, the forward pass 404 includes generating a bounding box to enclose the first cell in a first frame. The bounding box can be generated to have an area encompassing the cell, e.g., being a predefined percentage larger than a size of the cell, being a predetermined size selected for the cell under investigation (for example, and taking into consideration typical motions of the cell), etc. The bounding box is applied to a subsequent frame in a same position (i.e., a global or absolute position), which is likely to enclose the second cell. If the first cell and the second cell overlap (e.g., more than about 60%) in the bounding box in the consecutive frames, then the first and second cell are determined to be the same cell and an association is identified.

According to an embodiment of the present invention, the forward pass 404 includes evaluating one or more feature similarity cues of cells in consecutive frames. The feature similarity cues can include the appearance cue and motion cue. For example, a color histogram can be created for a first cell in a first same (or bounding box) and for a second cell in a second frame (or bounding box), and if the appearance representation of a cell (i.e., the appearance cue) is sufficient similar, the cells are considered to be the same cell and are associated. According to at least one embodiment of the present invention, a motion model is used in determining an association. Similar to the Kalman filter, the motion model is obtained by determining a velocity vector from a head location to a tail location (i.e., a head of the first cell tracklet to a head of second tracklet) of any two cell tracklets. If the locations of the heads of the first cell tracklet and the second cell tracklet are sufficiently close, then the cells corresponding to the first cell tracklet and the second cell tracklet are considered to be the same cell and an association is identified.

It should be understood that the forward pass 404 can include applications of the overlap criteria together with evaluations of one or more feature similarity cues, which generates a cumulative likelihood of a cell being the same cell in consecutive frames. Accordingly, in one or more embodiments of the present invention, a cumulative likelihood is used in identifying associations between cells in consecutive frames.

According to an embodiment of the present invention, the modeling phase 402 further includes mitosis modeling 405, performed to detect cell splitting captured in the image data. According to an exemplary embodiment of the present invention, mitosis modeling 405 is a backward pass tracing cell motion back in time to model mitosis events. In the mitosis modeling 405, previous positions of the cells of interest are predicted (e.g., each cell in the given image frame is assigned to one predecessor cell in a previous frame) based on the motion estimation from the forward pass 404. The mitosis modeling 405 detects a mother cell whenever two cell tracks claim a same cell in a previous frame with at least a threshold probability (e.g., 95% confidence). According to an embodiment of the present invention, the threshold probability is analogous to the confidence of tracklet, which combines an analysis of two or more feature similarities scores (e.g., motion and appearance similarities). According to an embodiment of the present invention, the mitosis modeling 405 includes modeling cell cycle duration, modeling a rate of mitosis and labeling, automatically, a plurality of cells with different identities.

According to an exemplary embodiment of the present invention, the system handles mitosis events by assuming that the mother cell will be disappeared in a subsequent frame and assigning two new identifications to two daughter cells in the subsequent frame, wherein the two daughter cells are detected as being produced by the mother cell in the mitosis event. According to an exemplary embodiment of the present invention, occluded (miss-detect) cells are distinguished from the process of mitosis using cell motion information produced by the global association 404. For example, if two tracklets of different cells converge to a same position, potentially being segmented as only a single cell in one or more intermediate frames, and subsequently separating on their respective tracklets, then this series of events is captured and identified, and no mitosis event will be identified. During the occlusion a dummy node is inserted in the tree to capture the occlusion event.

In view of the foregoing, according to an embodiment of the present invention three or more temporal frames are used to model the motion of each cell of interest (e.g., a given or current frame, a previous frame and a subsequent frame). According to an exemplary embodiment of the present invention, motion information is obtained by determining a velocity vector from a head location to a tail location (i.e., the head of a first track to the tail of a second track) of any two tracks determined for the cells segmented from the image data and associated in the forward pass 404.

Due to the changes in cell size, shape and brightness during mitosis, using only appearance information in a forward pass may be insufficient to make accurate associations between the cells 404 for the mitosis modeling 405. For example, in the case of similar moving cells, it can be difficult to distinguish cells only using the appearance cue; in this scenario, the information obtained from the dynamic information (e.g., movement detected using the forward pass 404 and backward pass 405) provides complementary information for a cell tracker to find correct trajectories for the cells of interest.

Figure 7:
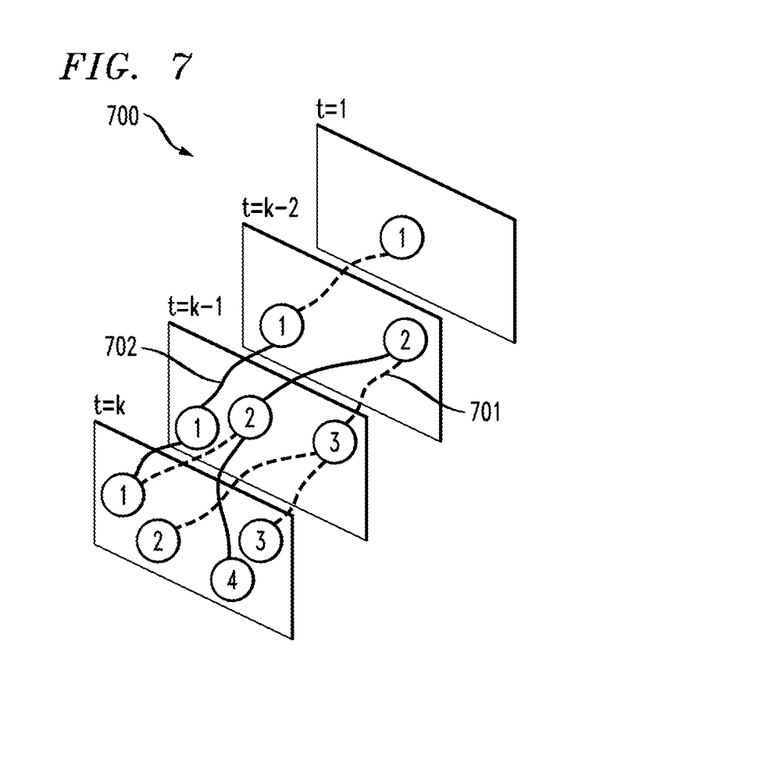
FIG. 7 is an illustration of a tracks detected in a sequence of images according to an embodiment of the present invention.

According to an exemplary embodiment of the present invention, the modeling phase 402 outputs a data structure (406) tracking cells in space over time (see also FIG. 7). The upper face 411 of the data structure (406) represents a first frame, giving an initial position of one or more cells. The data structure (406), thus includes a plurality of slices from an initial frame (i.e., time), with each frame corresponding to a slice, such that the position of a cell is represented through time as a tracklet, e.g., 412.

According to an exemplary embodiment of the present invention, high-level cell information 407 is generated from the cell tracking results 406. According to an exemplary embodiment of the present invention, high-level cell information 407 includes, for example, cell velocity and direction 408, the rate of mitosis 409 and morphological changes in the cells 410. This data can be useful for detecting abnormal cell (and/or tissue) development during a risk assessment (see FIG. 5).

Referring to the risk assessment 500, according to an exemplary embodiment of the present invention, high-level temporal features 501 are extracted from the previously obtained cell trajectories 407. According to an exemplary embodiment of the present invention, for normal and abnormal cell migration cases, a Recurrent Neural Network (RNN) is trained 502 using these high-level temporal features. According to an exemplary embodiment of the present invention, the system predicts temporal cell behavior via the temporal trained model and performs risk assessment atomically 503. The system uses the temporal data to predict a critical point, a time when the cell behavior will be risky, enabling accurate decisions to be made in a patient's treatment plan.

According to an exemplary embodiment of the present invention, once a cell tree lineage is generated by the tracking framework, the high-level information is extracted 407 to perform the risk assessment 500. According to an exemplary embodiment of the present invention, the system uses the RNN 502 to model temporal cell behavior and automatically perform a risk assessment 503. According to an exemplary embodiment of the present invention, the threshold of the risk assessment depends on the cell type, body tissues and cancer type. Accordingly, various thresholds can be used for the risk assessment 503. According to an exemplary embodiment of the present invention, the risk assessment 503 is used in determining a status of tissue development 504, such as in tracking the stages of a pre-cancerous tissue, and to make determinations of normal 505 or abnormal tissue status 506. In at least one exemplary embodiment of the present invention, the status of tissue development 504 detects an abnormal condition as the uncontrolled migration (e.g., by computing a migration rate) of the cells, and generates a risk of a tumor spreading and or cancer progression at 506.

According to one or more embodiments of the present invention, the abnormal condition is determined upon detecting a high mitotic rate (mitoses/millimeter$^2$) with a high number of cells dividing. The high mitotic rate is associated with a cancer that is more likely to grow and spread. For example, the mitotic rate is useful in determining a stage of thin melanomas. According to one or more embodiments of the present invention, the mitosis rate criteria is used to specify different stages of cancer development and abnormalities of the cell growth. An example of a staging system for melanoma, and useful in conjunction with one or more embodiments of the present invention, includes the American Joint Commission on Cancer (AJCC) TNM system, which is based on tumor information (T describing a size of original tumor, N describing a number of nearby lymph nodes, and M describing metastasis). For example, T1a: The melanoma is less than or equal to 1.0 millimeter thick (1.0 millimeter=$\frac{1}{25}$ of an inch), without ulceration and with a mitotic rate of less than 1/millimeter$^2$ T1b: The melanoma is less than or equal to 1.0 mm thick. It is ulcerated and/or the mitotic rate is equal to or greater than 1/mm$^2$.

According to an exemplary embodiment of the present invention, the system addresses missed detected cells in the assignment step. For example, a dummy node is inserted in the tree representing an occluded cell or a mis-detected cell (i.e., a cell originally occluded or otherwise mis-detected in a prior frame.

Referring again to the modeling phase 402, and more particularly the generation of the data structure (406) tracking cells in space over time, FIG. 7 illustrates the method, wherein dashed lines, e.g., 701 show initial tracks hypotheses and solid lines, e.g., 702, represent final cell tracks after pruning of the initial tracks. Preformed at block 603 of FIG. 6, the pruning keeps those cell tracks that more likely represent the real cell trajectories. According to an embodiment of the present invention, pruning can be performing using a threshold for confidence on the global association and/or mitosis modeling. For example, the system can prune tracks that have confidences less than a threshold (e.g., less than 75% confidence). According to at least one embodiment, the pruning is performed after the global association 404.

According to one or more embodiments of the present invention, each cell tracklet has a confidence, which is combination of feature similarity scores (e.g., motion and appearance similarities). During the assignment between the cells of each time step, tracklets having a confidence is less than the threshold are not chosen and are pruned from the data structure, since these candidate cells are more likely to be noise (e.g. false positives).

At block 604, feature cues are used to detect cell tracks in the image data over time. (This aligns with step 404 in FIG. 4.) According to an embodiment of the present invention, the feature cues include appearance cues of the cells and motion information (cell dynamics). The appearance cues and motion information are used to model the similarities of any pairwise cells over time. According to an exemplary embodiment of the present invention, a set of cell track hypothesis is constructed. Each cell track hypothesis is associated with a score. This score is a weighted combination of two scores: appearance similarity score and motion similarities score between the temporal cells. The score indicates a likelihood that the cells belong to the same cell track.

Recapitulation

According to an embodiment of the present invention, a system is configured to track cells (FIG. 4) and generating risk assessments (FIG. 5). According to an embodiment of the present invention, FIG. 6 illustrates a method 600 including obtaining image data 601, detecting cells in the image data 602, performing a modeling of the cells over time to generate a tree structure 603 (see FIG. 7), detecting cell tracks 604 (see also FIG. 4, data structure 406), and performing risk assessment 605 (see FIG. 5). According to an embodiment of the present invention, the risk assessment is based on high-level temporal features extracted from the cell trajectories (see FIG. 4, block 407).

Elements of one or more embodiments of the invention can be implemented, at least in part, in the form of an apparatus including a memory and at least one processor that is coupled to the memory and operative to perform exemplary method steps.

Figure 8:
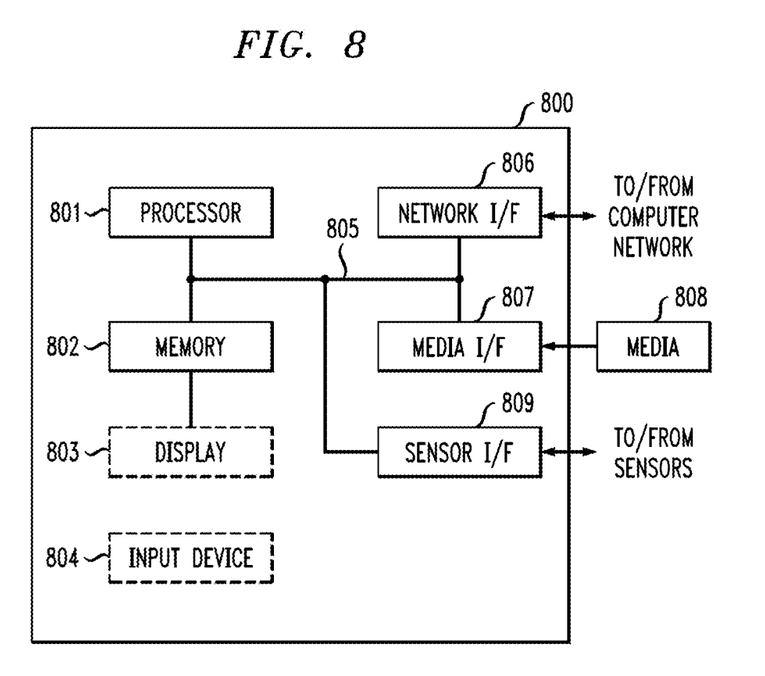
FIG. 8 is a block diagram depicting an exemplary computer system embodying a method for producing temporal cell trajectories and performing a risk assessment, according to an exemplary embodiment of the present invention.

One or more embodiments can make use of software running on a general purpose computer or workstation (e.g., to implement steps 601-605 and/or to carry cell tracking and risk assessment). With reference to FIG. 8, such an implementation might employ, for example, a processor 801, a memory 802, and an input/output interface formed, for example, by a display 803 and an input device 804 (e.g., keyboard). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 801, memory 802, and input/output interface such as display 803 and input device 804 can be interconnected, for example, via bus 805 as part of a data processing unit 800. Suitable interconnections, for example via bus 805, can also be provided to a network interface 806, such as a network card, which can be provided to interface with a computer network; to a media interface 807, such as a diskette or CD-ROM drive, which can be provided to interface with media 808; and/or to a sensor interface 809, such as analog-to-digital converter(s) or the like, which can be provided to interface with sensors or items to be controlled; e.g., the references, antenna elements, phase shifters, amps, etc.

Interfaces 806, 807 and 809 are generally representative of a variety of techniques for communicating with and controlling the various elements discussed herein. For example, processor 801 can communicate with the sensors, antenna elements, etc. over a wired or wireless computer network or directly with cabling.

A suitable optimization module may be stored in persistent memory and loaded into volatile memory to configure processor 801 to carry out the techniques described herein.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 801 coupled directly or indirectly to memory elements 802 through a system bus 805. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards, displays, pointing devices, and the like) can be coupled to the system either directly (such as via bus 805) or through intervening I/O controllers (omitted for clarity).

Network adapters such as network interface 805 may also be coupled to the system to enable the data processing system to become coupled to other data processing systems or remote printers or storage devices through intervening private or public networks. Modems, cable modem and Ethernet cards are just a few of the currently available types of network adapters. In one or more embodiments, network interface 806 and/or sensor interface 809 collect data and also send control signals.

Computer-human interfaces can be provided using, for example, a suitable graphical user interface (GUI) wherein a server serves html out to a browser on a user's client machine. Interfaces between software and/or hardware elements can employ hard-wired connections, networks, database programs to retrieve parameters from persistent storage, application programming interfaces (APIs), shared data structures, and the like.

As used herein, including the claims, a "server" includes a physical data processing system (for example, system 800 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for tracking a cell through a plurality of images, the computer program product comprising a non-transitory computer readable storage medium having program instructions embodied therewith, the program instructions executable by a processor to cause the processor to perform a method of tracking a cell through a plurality of images comprising:
   selecting at least one cell in at least one image obtained at a first time;
   generating a track of the at least one cell through a plurality of images, including the at least one image, obtained at different times using a forward tracking and a backward tracking, wherein generating the track comprises distinguishing, using information generated for the at least one cell by the forward tracking, between a visually occluded cell in at least one of the plurality of images and a mitosis event detected by the backward tracking; and
   generating a cell tree lineage of the at least one cell using the track.

2. The computer program product of claim 1, wherein generating the track of the cell through the plurality of images further comprises modeling a cell cycle duration of the cell.

3. The computer program product of claim 1, wherein generating the track of the cell through the plurality of images further comprises using the backward tracking in modeling a rate of mitosis of the cell.

4. The computer program product of claim 1, further comprising labeling, simultaneously, a plurality of cells, including the at least one cell, with different identities in the plurality of images.

5. The computer program product of claim 1, further comprising visualizing a progression of the cell over time through a graphical tree structure.

6. The computer program product of claim 1, further comprising building a tree of potential track hypotheses for the cell.

7. The computer program product of claim 6, further comprising inserting a dummy node in the tree to represent an occluded cell, wherein the dummy node represents the occluded cell that is visually occluded in the at least one image by another cell.

8. The computer program product of claim 1, further comprising analyzing an appearance cue of the cell accounting for a similarity of the cell to a pairwise cell over time.

9. The computer program product of claim 1, further comprising inferring high-level information from the track including at least one of a rate of mitosis of the cell and a velocity of the cell.

10. A computer program product for tracking a cell through a plurality of images, the computer program product comprising a non-transitory computer readable storage medium having program instructions embodied therewith, the program instructions executable by a processor to cause the processor to perform a method of tracking cells in a time-lapse sequence of images comprising:
    detecting a plurality of cells in at least one image of the time-lapse sequence of images;
    generating, from the at least one image, a track for each of the plurality of cells through the time-lapse sequence of images using a forward tracking;
    performing a backward tracking tracing each of the tracks back in time through the time-lapse sequence of images until detecting a potential respective mitosis event where two of the tracks claim a same cell;

labeling, simultaneously, the plurality of cells with different identities in the plurality of images using the forward tracking and the backward tracking;
generating a cell tree lineage of the plurality of cells using the tracks and labeling; and
modeling a rate of mitosis for the plurality of cells using the cell tree lineage,
wherein the labeling of the plurality of cells with different identities in the plurality of images using the forward tracking and the backward tracking comprises:
distinguishing, for each of the potential respective mitosis events, between a visual occlusion of one cell by another cell and an actual mitosis event; and
labeling, for at least one distinguished visual occlusion, each of the cells associated with the visual occlusion in at least one image of the time-lapse sequence of images.

11. The computer program product of claim 10, further comprising:
determining a confidence for each of the tracks; and
pruning at least one track associating cells in sequential images of the time-lapse sequence of images, the at least one track having a confidence less than a threshold.

12. The computer program product of claim 11, wherein the pruning is performed prior to the backward tracking.

13. The computer program product of claim 11, wherein the confidence of each of the tracks is determined using a combination of feature similarity scores for the respective cell over time.

14. The computer program product of claim 10, further comprising:
detecting an abnormal condition in the cell tree lineage; and
determining a risk associated with the plurality of cells.

15. The computer program product of claim 10, wherein generating the cell tree linage comprises outputting a representation comprising a plurality of slices corresponding to the plurality of images arranged in order of time, wherein the presentation includes a visualization of a plurality of tracklets, each tracklet corresponding to a location of a given one of the plurality of cells over time.

16. The computer program product of claim 10, further comprising modeling a cell cycle duration of a first cell of the plurality of cells using a respective one of the mitosis events as a starting time of a cell cycle of the first cell.

17. The computer program product of claim 10, wherein the generation of the cell tree lineage of the plurality of cells includes inserting a dummy node in the cell tree lineage, the dummy node representing the visually occluded cell in the at least one image.

* * * * *